United States Patent
Su et al.

(10) Patent No.: US 9,280,459 B2
(45) Date of Patent: Mar. 8, 2016

(54) BLOCK GROUPING METHOD FOR GARBAGE COLLECTION OF SOLID STATE DRIVE

(71) Applicant: LITE-ON TECHNOLOGY CORPORATION, Taipei (TW)

(72) Inventors: Chung-Yi Su, Hsinchu (TW); Chia-Lun Li, Hsinchu (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 79 days.

(21) Appl. No.: 14/042,808

(22) Filed: Oct. 1, 2013

(65) Prior Publication Data

US 2015/0026391 A1    Jan. 22, 2015

(30) Foreign Application Priority Data

Jul. 17, 2013  (CN) .......................... 2013 1 0300066

(51) Int. Cl.
  *G06F 12/02* (2006.01)
(52) U.S. Cl.
  CPC ........ *G06F 12/0246* (2013.01); *G06F 12/0253* (2013.01); *G06F 2212/1016* (2013.01); *G06F 2212/7205* (2013.01)

(58) Field of Classification Search
  None
  See application file for complete search history.

(56) References Cited

U.S. PATENT DOCUMENTS

| | | | |
|---|---|---|---|
| 2012/0066438 A1* | 3/2012 | Yoon et al. | 711/103 |
| 2012/0239851 A1* | 9/2012 | Calvert et al. | 711/103 |
| 2012/0239853 A1* | 9/2012 | Moshayedi | G06F 11/1441 711/103 |

* cited by examiner

Primary Examiner — Jared Rutz
Assistant Examiner — Christopher Do
(74) Attorney, Agent, or Firm — WPAT, PC; Justin King

(57) ABSTRACT

A block grouping method includes the following steps. Firstly, a link list is established. In the link list, plural blocks are classified into plural groups according to valid data counts of respective blocks. If a host refreshes a stored data of a flash memory of the solid state drive or adds a new data into the flash memory, the valid data count of the block corresponding to the refreshed data or the new data is changed, and the link list is updated according to the changed valid data count of the block. After the garbage collection is started by the solid state drive, the block to be subject to the garbage collection is selected according to the link list, and the garbage collection is performed.

3 Claims, 6 Drawing Sheets

|  | Page_1 | Page_2 | Page_3 | Page_4 |
|---|---|---|---|---|
| Block_1 | ~~Data1~~ | ~~Data2~~ | Data3 | ~~Data4~~ |
| Block_2 | Data5 | ~~Data6~~ | ~~Data7~~ | Data8 |
| Block_3 |  |  |  |  |
| Block_4 |  | Data1' |  |  |
| Block_5 |  |  | Data2' |  |
| Block_6 |  | Data6' | Data7' |  |
| Block_7 |  | Data4' |  |  |
| Block_8 |  |  |  |  |

FIG. 2B (PRIOR ART)

|  | Page_1 | Page_2 | Page_3 | Page_4 |
|---|---|---|---|---|
| Block_1 | ~~Data1~~ | ~~Data2~~ | Data3 | ~~Data4~~ |
| Block_2 | Data5 | ~~Data6~~ | ~~Data7~~ | Data8 |
| Block_3 |  | Data6" |  |  |
| Block_4 | Data2" | ~~Data1'~~ |  |  |
| Block_5 |  | Data1" | ~~Data2'~~ |  |
| Block_6 | Data4" | ~~Data6'~~ | ~~Data7'~~ | Data7" |
| Block_7 |  | ~~Data4'~~ |  |  |
| Block_8 |  |  |  |  |

FIG. 2C (PRIOR ART)

|  | Page_1 | Page_2 | Page_3 | Page_4 |
|---|---|---|---|---|
| Block_1 | ~~Data1~~ | ~~Data2~~ | Data3 | ~~Data4~~ |
| Block_2 | Data5 | ~~Data6~~ | ~~Data7~~ | Data8 |
| Block_3 |  | Data6" |  |  |
| Block_4 | Data2''' | ~~Data1'~~ |  | Data7''' |
| Block_5 |  | Data1" | ~~Data2'~~ |  |
| Block_6 | Data4" | ~~Data6'~~ | ~~Data7'~~ | ~~Data7"~~ |
| Block_7 |  | ~~Data4'~~ |  |  |
| Block_8 |  |  |  |  |

FIG. 2D (PRIOR ART)

|  | Page_1 | Page_2 | Page_3 | Page_4 |
|---|---|---|---|---|
| Block_1 | ~~Data1~~ | ~~Data2~~ | ~~Data3~~ | ~~Data4~~ |
| Block_2 | ~~Data5~~ | ~~Data6~~ | ~~Data7~~ | ~~Data8~~ |
| Block_3 |  | Data6" |  |  |
| Block_4 | Data2''' | ~~Data1'~~ |  | Data7''' |
| Block_5 |  | Data1" | ~~Data2'~~ |  |
| Block_6 | ~~Data4"~~ | ~~Data6'~~ | ~~Data7'~~ | ~~Data7"~~ |
| Block_7 |  | ~~Data4'~~ |  |  |
| Block_8 | Data3 | Data5 | Data8 | Data4" |

FIG. 2E (PRIOR ART)

|  | Page_1 | Page_2 | Page_3 | Page_4 |
|---|---|---|---|---|
| Block_1 |  |  |  |  |
| Block_2 |  |  |  |  |
| Block_3 |  | Data6" |  |  |
| Block_4 | Data2" | Data1' |  | Data7''' |
| Block_5 |  | Data1" | Data2' |  |
| Block_6 |  |  |  |  |
| Block_7 |  | Data4' |  |  |
| Block_8 | Data3 | Data5 | Data8 | Data4" |

FIG. 2F (PRIOR ART)

BLOCK GROUPING METHOD FOR GARBAGE COLLECTION OF SOLID STATE DRIVE

STATE DRIVE

This application claims the benefit of People's Republic of China Application Serial No. 201310300066.8, filed Jul. 17, 2013, the subject matter of which is incorporated herein by reference.

FIELD OF THE INVENTION

The present invention relates to a solid state drive, and more particularly to a block grouping method for a garbage collection of a solid state drive.

BACKGROUND OF THE INVENTION

As is well known, a solid state drive (SSD) is a data storage device that uses a NAND-based flash memory to store data. The NAND-based flash memory is a non-volatile memory. After data are written to the flash memory, if no power is supplied to the flash memory, the data are still retained in the flash memory.

FIG. 1 is a schematic functional block diagram illustrating a conventional solid state drive. As shown in FIG. 1, the solid state drive 10 comprises a controlling unit 101, a temporary storage unit 103, and a flash memory 105. The flash memory 105 is accessible by the controlling unit 101 through an internal bus 107. In addition, the controlling unit 101 is in communication with a host 12 through an external bus 20. Consequently, commands and data can be exchanged between the controlling unit 101 and the host 12. The temporary storage unit 103 is a random access memory for temporarily storing the read date, the write data or the temporary parameter which is required for the controlling unit 101. Moreover, the external bus 20 is a USB bus, an IEEE 1394 bus, an SATA bus, or the like.

Generally, the flash memory 105 comprises plural blocks. Each block comprises plural pages (or sectors), for example 64 pages. Each page is typically 4K bytes in size. Due to the inherent properties of the flash memory 105, at least one page is written at a time during the writing operation, but a block is erased during the erasing operation.

Due to the inherent properties of the flash memory 105, the data of each page fails to be arbitrarily refreshed. Consequently, after a refreshed data is received by the flash memory 105, the refreshed data is firstly stored in a new page (i.e. a blank page), and the original data in the old page is set as an invalid data. After the data of all pages of a whole block are invalid data, the block is erased as a free block.

However, after the flash memory 105 has been accessed for a long time, each block of the flash memory 105 may contain some valid data and some invalid data. The block containing the valid data fails to be erased.

Since the space of the flash memory 105 is occupied by the invalid data, the writable space of the flash memory is gradually reduced. For solving the above drawbacks, a garbage collection has been disclosed. Hereinafter, a garbage collection process will be illustrated with reference to FIGS. 2A~2F. It is assumed that the flash memory 105 has eight blocks (Block_1~Block_8) and each of the blocks has four pages (Page_1~Page_4). It is noted that the number of blocks and the number of pages in each block are not restricted.

FIGS. 2A~2F schematically illustrate a process of refreshing, moving and erasing data of a flash memory of a solid state drive. The architecture of the solid state drive is similar to that of the solid state drive of FIG. 1, and is not redundantly described herein.

As shown in FIG. 2A, all pages of the first block (Block_1) store the data Data1~Data4, and all pages of the second block (Block_2) store the data Data5~Data8.

In a case that the host 12 wants to refresh the data Data1, Data2, Data4, Data6 and Data7 into the data Data1', Data2', Data4', Data6' and Data7', respectively, the refreshed data will be stored in blank pages of the flash memory by the controlling unit 101 (see FIG. 2B). For example, the data Data1' is written into the second page (page_2) of the fourth block (Block_4), the data Data2' is written into the third page page_3 of the fifth block (Block_5), the data Data4' is written into the second page (page_2) of the seventh block (Block_7), the data Data6' is written into the second page (page_2) of the sixth block (Block_6), and the data Data7' is written into the third page (page_3) of the sixth block (Block_6). From now on, the pages originally storing the data Data1, Data2, Data4, Data6 and Data7 are considered as invalid pages, which are indicated by oblique lines.

In case that the host 12 wants to refresh the data Data1', Data2', Data4', Data6' and Data7' into the data Data1", Data2", Data4", Data6" and Data7", respectively, the refreshed data will be stored in blank pages of the flash memory by the controlling unit 101 (see FIG. 2C). For example, the data Data1" is written into the second page (page_2) of the fifth block (Block_5), the data Data2" is written into the first page (page_1) of the fourth block (Block_4), the data Data4" is written into the first page (page_1) of the sixth block (Block_6), the data Data6" is written into the second page (page_2) of the third block (Block_3), and the data Data7" is written into the fourth page (page_4) of the sixth block (Block_6). From now on, the data pages originally storing the data Data1', Data2', Data4', Data6' and Data7' are considered as invalid pages, which are indicated by oblique lines.

In case that the host 12 wants to refresh the data Data7" into the data Data7''', the refreshed data will be stored in a blank page of the flash memory by the controlling unit 101 (see FIG. 2D). For example, the data Data7''' is written into the fourth page (page_4) of the fourth block (Block_4). From now on, the data page originally storing the data Data7" is considered as an invalid page, which is indicated by an oblique line.

From the above discussions, after many times of accessing operations by the host 12, the flash memory 105 may contain a great number of invalid data (see the oblique lines as shown in FIG. 2D). Moreover, the erasing operation of the flash memory 105 can be performed in a block-wise fashion. Although the flash memory as shown in FIG. 2D has many invalid data, some blocks still contain valid data. In other words, the block containing the valid data fails to be erased by the controlling unit 101. Since the space of the flash memory is occupied by the invalid data, the writable space of the flash memory is gradually reduced.

Consequently, for avoiding reduction of the writable space, the garbage collection should be performed by the controlling unit 101 of the solid state drive 10 at the appropriate time. The garbage collection is a process of collecting valid data of the old block and storing the valid data into another new block by the controlling unit 101. After the valid data are collected and re-stored, the data of all pages of the old block are changed into the invalid pages, so that the old block may be erased and reused as a free block. Under this circumstance, the writable space of the flash memory is enhanced. Moreover, after the garbage collection is done, the space of the new free block becomes the available space again.

For example, after the situation of FIG. 2D, the controlling unit 101 starts to perform the garbage collection. Consequently, the data Data3 in the third page (Page_3) of the first block (Block_1), the data Data5 in the first page (Page_1) of the second block (Block_2), the data Data8 in the fourth page (Page_4) of the second block (Block_2) and the data Data4" in the first page (Page_1) of the sixth block (Block_6) will be collected and written into a blank eighth block (Block_8) by the controlling unit 101.

After the data Data3, Data5, Data8 and Data4" are written into the eighth block (Block_8), all data in the first block (Block_1), the second (Block_2) and the sixth block (Block_6) of the flash memory 105 become invalid data (see FIG. 2E). Consequently, the controlling unit 101 may perform the block-erasing operation on the first block (Block_1), the second block (Block_2) and the sixth block (Block_6). Then, as shown in FIG. 2F, the first block (Block_1), the second block (Block_2) and the sixth block (Block_6) become free blocks. Under this circumstance, the flash memory 105 releases more writable space.

From the above discussions, the garbage collection may release more writable space of the flash memory 105. However, if the flash memory 105 is a larger-capacity memory, the flash memory 105 may have at least several thousands of blocks. Before the garbage collection is performed by the solid state drive 10, the controlling unit 101 should check the valid data of each block sequentially, and select the block with low valid data count to be subject to the garbage collection. In other words, the number of valid data to be moved should be as low as possible.

Since the information of the valid data of each block should be successively searched during each garbage collection, it is time-consuming for the controlling unit 101 to search the information. In other words, the conventional method of controlling the garbage collection is not efficient.

SUMMARY OF THE INVENTION

An embodiment of the present invention provides a block grouping method for a garbage collection of a solid state drive. The block grouping method includes the following steps. Firstly, a link list is established. In the link list, plural blocks are classified into plural groups according to valid data counts of respective blocks. Then, it is judged whether a host refreshes a stored data of a flash memory of the solid state drive or adds a new data into the flash memory. If the judging condition is satisfied, the valid data count of the block corresponding to the refreshed data or the new data is changed, and the link list is updated according to the changed valid data count of the block. If the garbage collection is not started by the solid state drive, the judging step is repeatedly done again. After the garbage collection is started by the solid state drive, the block to be subject to the garbage collection is selected according to the link list, and the garbage collection is performed.

Another embodiment of the present invention provides a solid state drive. The solid state drive is in communication with a host. The solid state drive includes a flash memory, a flash memory, and a temporary storage unit. The flash memory includes plural blocks. The controlling unit may receive a refreshed data or a new data from the host, and establish a link list. The temporary storage unit is connected with the controlling unit for storing the link list. In the link list, the plural blocks are classified into plural groups according to valid data counts of respective blocks, wherein if the refreshed data or the new data is transmitted from host to the flash memory, the controlling unit changes the valid data count of the block corresponding to the refreshed data or the new data and updates the link list according to the changed valid data count of the block, wherein after the garbage collection is started by the solid state drive, the controlling unit selects the block to be subject to the garbage collection according to the link list, and performs the garbage collection.

Another embodiment of the present invention provides a block grouping method for a garbage collection of a solid state drive. The block grouping method includes the following steps. Firstly, a link list is established. In the link list, plural blocks are classified into plural groups according to valid data counts of respective blocks. Then, the link list is updated when the valid data count of at least one of the blocks is changed. If the garbage collection is to be started, at least one of the groups with lower valid data count is selected according to the link list, and at least one of the blocks belong to the selected group is selected to perform the garbage collection.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 1 (prior art) is a schematic functional block diagram illustrating a conventional solid state drive;

FIGS. 2A~2F (prior art) schematically illustrate a process of refreshing, moving and erasing data of a flash memory of a solid state drive;

DETAILED DESCRIPTION OF PREFERRED EMBODIMENTS

Figures 1, 2A:
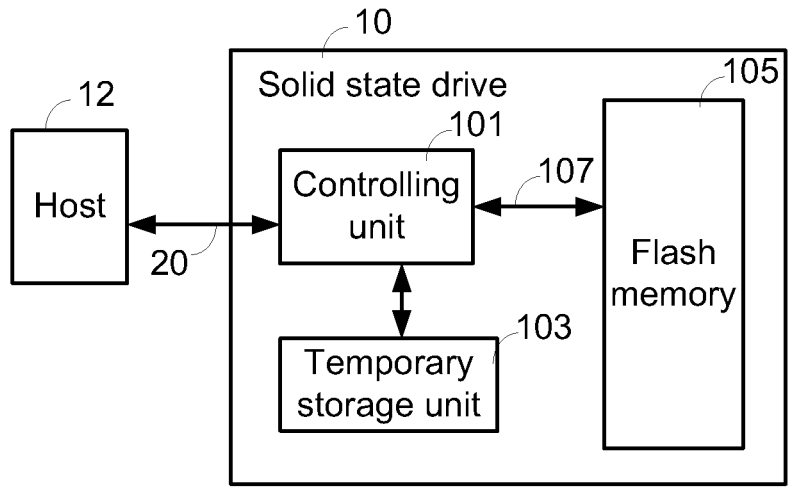

The present invention provides an improved method of controlling a garbage collection of a solid state drive in order to enhance the efficiency of performing the garbage collection of the solid state drive. The method of the present invention may be applied to the solid state drive with the architecture as shown in FIG. 1. It is noted that the applications of the method of the present invention are not restricted to the solid state drive of FIG. 1. In particular, the method of the present invention may be applied to any other solid state drive with the garbage collection capability.

As previously described, the controlling unit 101 should check the valid data of each block sequentially and select the block with low valid data count to perform the garbage collection before the garbage collection is performed by the solid state drive 10. Consequently, it is time-consuming for the controlling unit 101 to search the information, and the conventional method of controlling the garbage collection is not efficient.

In accordance with a feature of the present invention, when the solid state drive 10 is powered on and an initialization procedure is performed, the controlling unit 101 may firstly establish a link list in the temporary storage unit 103 according to the valid data counts of all blocks. In the link list, all blocks are classified into several groups according to the valid data counts of respective blocks.

After the initialization procedure is completed and the data of the solid state drive 10 can be normally accessed by the host 12, the controlling unit 101 will store the refreshed data provided by the host 12 into blank pages. Under this circumstance, the old data corresponding to the refreshed data will be considered as invalid data, and the valid data count of the block containing the old data and the refreshed data will be changed. Moreover, in case that the valid data count of the block is changed, the link list in the temporary storage unit 103 is also updated by the controlling unit 101.

Figure 3A:
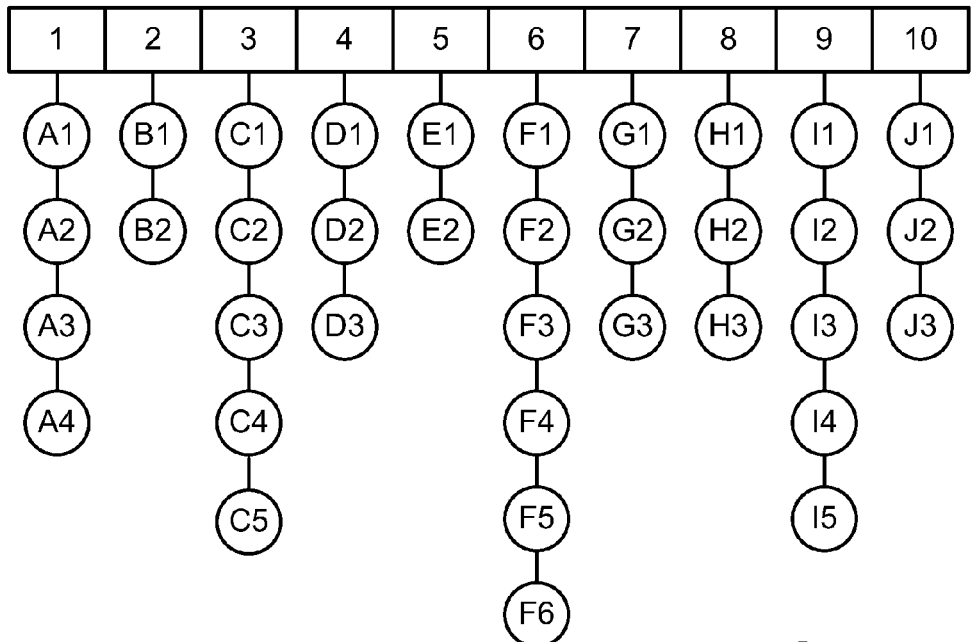
FIGS. 3A and 3B schematically illustrate a block grouping method for classifying blocks into several groups according to the valid data count.
Figure 3B:
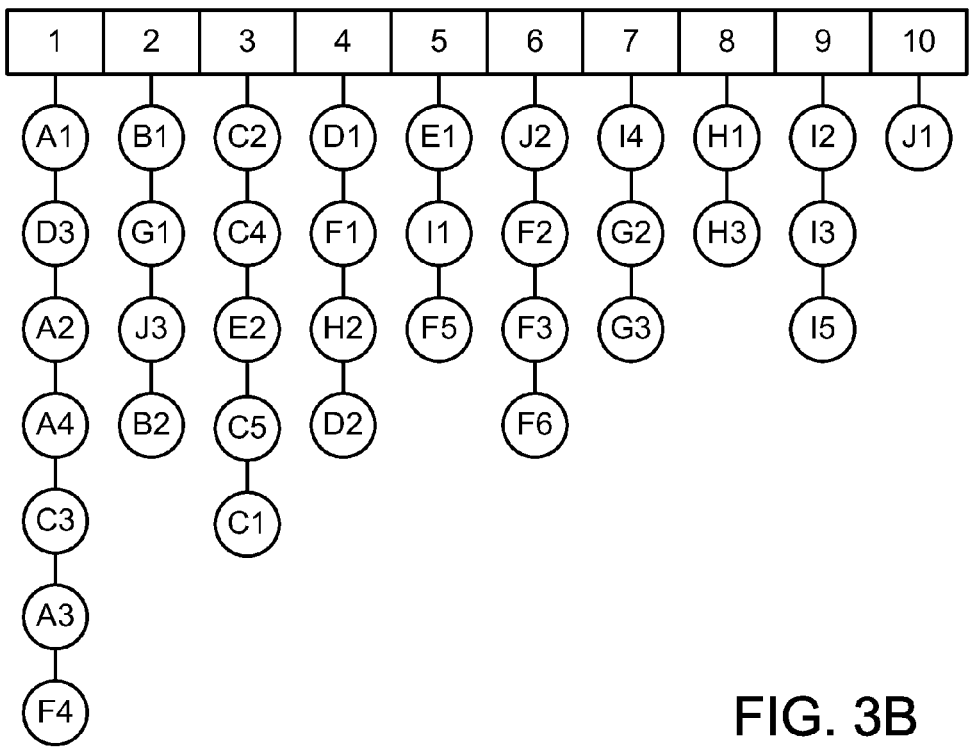

FIGS. 3A and 3B schematically illustrate a block grouping method for classifying blocks into several groups according to the valid data count. In this embodiment, during the initialization procedure of the solid state drive 10, the valid data counts are divided into ten valid data count intervals. For example, the valid data counts from 1 to 100 belong to a first valid data count interval. The valid data counts from 101 to 200 belong to a second valid data count interval. The valid data counts from 201 to 300 belong to a third valid data count interval. The rest may be deduced by analogy. The valid data counts higher than 901 belong to a tenth valid data count interval.

Then, all blocks in the flash memory 105 are classified into several groups according to the valid data counts of respective blocks. For example, the blocks in the flash memory 105 are classified into ten groups according to valid data counts of respective blocks. After the group classification, as shown in FIG. 3A, the first group (1) comprises four blocks A1~A4; the second group (2) comprises two blocks B1~B2; the third group (3) comprises five blocks C1~C5; the fourth group (4) comprises three blocks D1~D3; the fifth group (5) comprises two blocks E1~E2; the sixth group (6) comprises six blocks F1~F6; the seventh group (7) comprises three blocks G1~G3; the eighth group (8) comprises three blocks H1~H3; the ninth group (9) comprises five blocks I1~I5; and the tenth group (10) comprises three blocks J1~J3.

Moreover, the blocks of each group may be sorted and linked according to one or more specified parameters. In case that the specified parameter is the valid data count, the lowermost block A4 and the uppermost A1 of the first group (1) have the highest valid data count and the lowest valid data count, respectively. It is noted that the specified parameter is not restricted to the valid data count. For example, in some other embodiments, the specified parameter is an erase count or a history number of each block.

After the link list of the solid state drive 10 is established by the controlling unit 101 and stored in the temporary storage unit 103, the data in the flash memory can be normally accessed by the host 12.

As the number of write commands transmitted from the host 12 increases, the valid data count of each block correspondingly changes. For example, if the write data is a new data, the valid data count of the written block increases. Whereas, if the write data is a refreshed data, the valid data count of the written block increases. Moreover, since the old data corresponding to the refreshed data is considered as the invalid data, the valid data count of the block storing the old data decreases. Of course, the host 12 may transmit a delete command to the solid state drive 10. In response to the delete command, the valid data count of the specified block storing associated data will decrease.

Moreover, according to the command from the host 10 and the data modification of the flash memory 105, the link list in the temporary storage unit 103 may be updated by the controlling unit 101. In case that the valid data count of a specified block is changed, the controlling unit 101 will judge whether the specified block is classified into another group according to the changed valid data count. In case that the specified parameter of a specified block is changed, the controlling unit 101 will re-sort the blocks of the corresponding group according to the changed specified parameter. After many times of accessing operations by the host 12, if the solid state drive 10 is ready to perform the garbage collection, the block to be subject to the garbage collection is quickly selected by the controlling unit 101 according to the contents of the updated link list in the temporary storage unit 103. Consequently, the garbage collection can be effectively performed.

For example, after many times of accessing operations, the contents of the link list in the temporary storage unit 103 is shown in FIG. 3B. When the solid state drive 10 is ready to perform the garbage collection, it is not necessary for the controlling unit 101 to successively search the valid data counts of all blocks. For example, only the blocks of the first group (1) may be selected from the link by the controlling unit 101 in order to be subject to the garbage collection.

Figure 4:
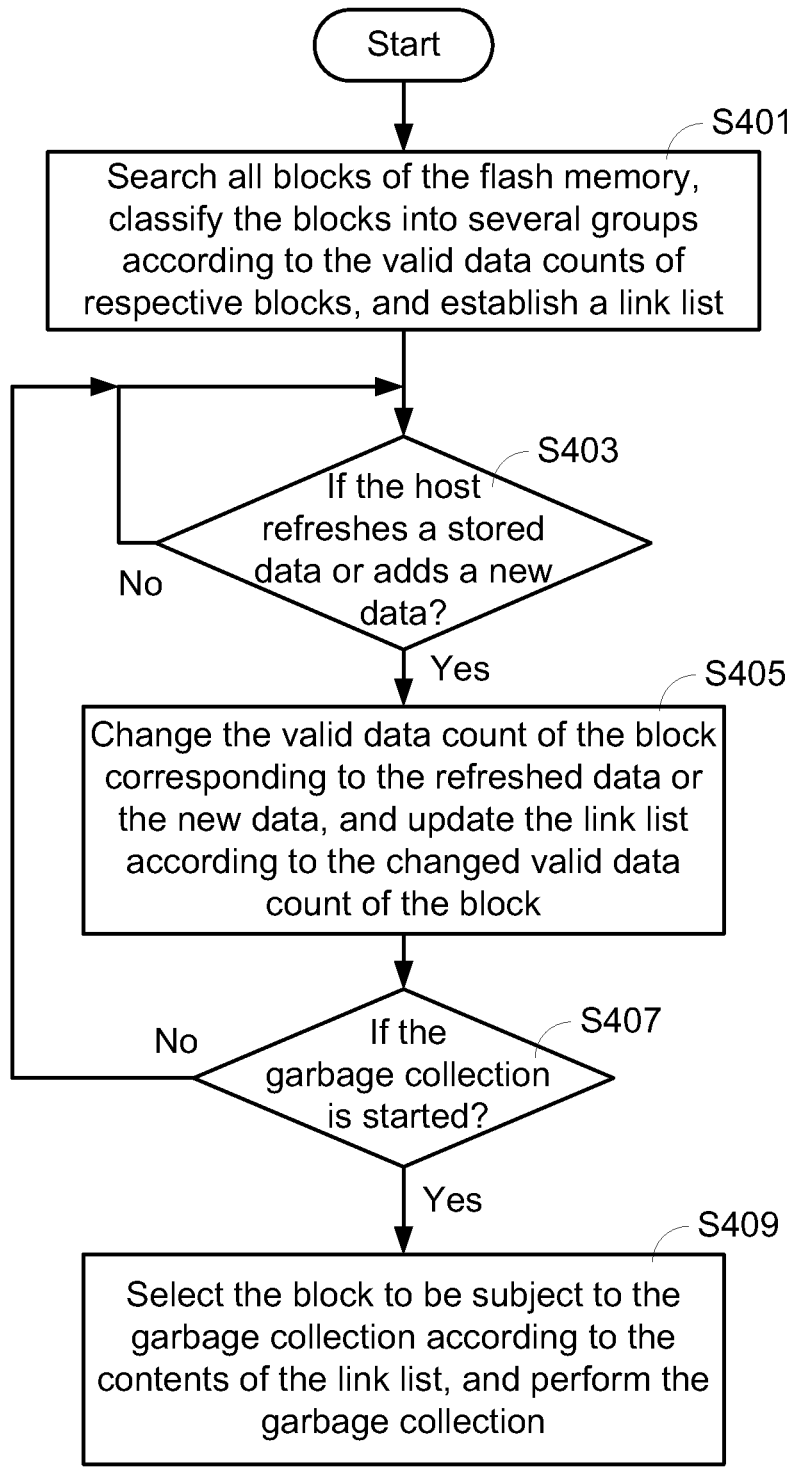
FIG. 4 is a flowchart illustrating a block grouping method for a garbage collection of a solid state drive according to an embodiment of the present invention.

For example, if the specified parameter is the valid data count, since the blocks A2, A4, C3, A3 and F4 of the first group (1) have the lowest valid data counts, these blocks are selected by the controlling unit 101 in order to be subject to the garbage collection. Consequently, the efficiency of performing the garbage collection will be largely enhanced. Moreover, if the number of blocks belonging the first group (1) is very small, the blocks of the second group (2) and the blocks of the first group (1) may be collaboratively selected by the controlling unit 101 in order to be subject to the garbage collection FIG. 4 is a flowchart illustrating a block grouping method for a garbage collection of a solid state drive according to an embodiment of the present invention.

During the initialization procedure of the solid state drive 10, all blocks of the flash memory 105 are searched, the blocks are classified into several groups according to the valid data counts of respective blocks, and a link list is established (Step S401).

In case that the solid state drive 10 can be normally accessed by the host 12, the step S403 is performed to judge whether the host 12 refreshes a stored data of a flash memory 105 or adds a new data into the flash memory 105.

If the host 12 does not refresh the stored data or add the new data, the step S403 is repeatedly done. On the other hand, if the host 12 refreshes the stored data or adds the new data, the valid data count of the block corresponding to the refreshed data or the new data is changed, and the link list is updated according to the changed valid data count of the block (Step 405).

Then, the step S407 is performed to judge whether the garbage collection is started by the solid state drive 10. If the garbage collection is not started, the step S403 is repeatedly done. On the other hand, if the garbage collection is started by the solid state drive 10, the block to be subject to the garbage collection is selected according to the contents of the link list, and the garbage collection is performed (Step S409).

From the above descriptions, the present invention provides a block grouping method for a garbage collection of a solid state drive. A link list is established and stored in a temporary storage unit of the solid state drive. In the link list, plural blocks are classified into plural groups according to valid data counts of respective blocks. In case that a refreshed data or a new data is transmitted from host to the flash memory, the controlling unit changes the valid data count of the block corresponding to the refreshed data or the new data and updates the link list according to the changed valid data count of the block. By the block grouping method of the present invention, it is not necessary for the controlling unit to successively search the valid data counts of all blocks during the garbage collection. That is, by searching the group with the low valid data count from the link list and selecting the corresponding block to be subject to the garbage collection, the efficiency of performing the garbage collection will be largely enhanced.

Moreover, in some other embodiments, each group may be further divided into many subgroups. For example, as shown in FIG. 3A, the valid data counts higher than 901 (i.e. the tenth valid data count interval corresponding to the tenth group (10)) may be divided into several sub-intervals, and a sub-link list corresponding to the tenth group (10) is established according to the specified parameter. The way of establishing the sub-link list is similar to the way of establishing the link list, and is not redundantly described herein.

In the above embodiments, the valid data count intervals of all groups have equal ranges. It is noted that numerous modifications and alterations may be made while retaining the teachings of the invention. For example, in some other embodiments, the controlling unit 101 may set the plural valid data count intervals of all blocks according to a valid data count distribution of these blocks. In case that the valid data counts of 10% of all blocks are in the range between 1 and 900 and the valid data counts of 90% of all blocks are in the range between 901 and 1000, the valid data counts from 1 to 900 may be defined as a first valid data count interval by the controlling unit 101, and the valid data counts from 901 and 1000 may be divided into several valid data count intervals. For example, the valid data counts from 901 to 920 may be defined as a second valid data count interval; the valid data counts from 921 to 940 may be defined as a third valid data count interval; and the rest may be deduced by analogy.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures

What is claimed is:

1. A block grouping method for a garbage collection of a solid state drive, the block grouping method comprising steps of: establishing a link list, wherein in the link list, plural blocks are classified into plural groups according to valid data counts of respective blocks, wherein the blocks in the plural groups are further sorted and linked according to a specified parameter, wherein the specified parameter includes an erase count of each block or a history number of each block; and after the garbage collection is started by the solid state drive, selecting the block to be subject to the garbage collection according to the link list, and performing the garbage collection; wherein the step of establishing the link list comprises sub-steps of: providing plural valid data count intervals; classifying M blocks of the plural blocks corresponding to a first valid data count interval of the plural valid data count intervals into a first group; and classifying N blocks of the plural blocks corresponding to a second valid data count interval of the plural valid data count intervals into a second group, wherein M and N are 0 or positive integers, wherein the plural valid data count intervals are determined according to a valid data count distribution of the plural blocks, and a range size of the first valid data count interval is different from that of the second valid data count interval.

2. A solid state drive in communication with a host, the solid state drive comprising: a flash memory comprising plural blocks; a controlling unit for receiving a refreshed data or a new data from the host, and establishing a link list; and a temporary storage unit connected with the controlling unit for storing the link list, wherein in the link list, the plural blocks are classified into plural groups according to valid data counts of respective blocks, wherein the blocks in the plural groups are further sorted and linked according to a specified parameter, wherein the specified parameter includes an erase count of each block or a history number of each block, wherein the link list established by the controlling unit comprises plural valid data count intervals corresponding to the plural groups, wherein M blocks of the plural blocks corresponding to a first valid data count interval of the plural valid data count intervals are classified into a first group, and N blocks of the plural blocks corresponding to a second valid data count interval of the plural valid data count intervals are classified into a second group, wherein M and N are 0 or positive integers, wherein the plural valid data count intervals are determined according to a valid data count distribution of the plural blocks , and a range size of the first valid data count interval is different from that of the second valid data count interval.

3. A block grouping method for a garbage collection of a solid state drive, the block grouping method comprising steps of: establishing a link list, wherein in the link list, plural blocks are classified into plural groups according to valid data counts of respective blocks, wherein the blocks in the plural groups are further sorted and linked according to a specified parameter, wherein the specified parameter includes an erase count of each block or a history number of each block; updating the link list when the valid data count of at least one of the blocks is changed; and if the garbage collection is to be started, selecting at least one of the groups with lower valid data count according to the link list, and selecting at least one of the blocks belong to the selected group to perform the garbage collection, wherein the step of establishing the link list comprises sub-steps of providing plural valid data count intervals, classifying M blocks of the plural blocks corresponding to a first valid data count interval of the plural valid data count intervals into a first group, and classifying N blocks of the plural blocks corresponding to a second valid data count interval of the plural valid data count intervals into a second group, wherein M and N are 0 or positive integers, each of M valid data counts of corresponding M blocks lies in the first valid data count interval, and each of N valid data counts of corresponding N blocks lies in the second valid data count interval, wherein the plural valid data count intervals are determined according to a valid data count distribution of the plural blocks, and a range size of the first valid data count interval is different from that of the second valid data count interval.

* * * * *